United States Patent
Holtz (12)

(10) Patent No.: US 6,433,800 B1
(45) Date of Patent: *Aug. 13, 2002

(54) GRAPHICAL ACTION INVOCATION METHOD, AND ASSOCIATED METHOD, FOR A COMPUTER SYSTEM

(75) Inventor: Brian Holtz, Redwood Shores, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,766

(22) Filed: Aug. 31, 1998

(51) Int. Cl.[7] .................................................. G06F 3/00
(52) U.S. Cl. ....................................... 345/835; 345/769
(58) Field of Search ................................ 345/348, 349, 345/352–354, 356, 835, 810, 825, 840–841, 853, 854, 769

(56) References Cited

U.S. PATENT DOCUMENTS 5,546,527 A * 8/1996 Fitzpatrick et al. ......... 345/348
5,715,413 A * 2/1998 Ishai et al. .................. 345/349
5,745,112 A * 4/1998 Hirose ........................ 345/349
5,835,919 A * 11/1998 Stern et al. .................. 707/515

OTHER PUBLICATIONS

Person et al. ("Using Windows 95, Special Edition", pp. 285–286 and 309, 1997, QUE).*

Getting Results with Microsoft Office 95, 1997 (p. 116).*

* cited by examiner

Primary Examiner—Kristine Kincaid
Assistant Examiner—Sy D Luu
(74) Attorney, Agent, or Firm—Jed W. Caven; William J. Kubida; Hogan & Hartson LLP

(57) ABSTRACT

Apparatus, and an associated method, provides iconic representations of actions available to be performed upon an object of a particular datatype. The iconic representations are displayed, for instance, as part of a toolbar on a computer display. A representation of an object upon which an action is to be performed is dragged-and-dropped upon the iconic representation of the selected action to invoke that action upon both the dropped object and the object of a particular datatype.

10 Claims, 6 Drawing Sheets

GRAPHICAL ACTION INVOCATION METHOD, AND ASSOCIATED METHOD, FOR A COMPUTER SYSTEM

The present invention relates generally to a computer system in which objects resident therein are datatyped according to their type. Each type of object has a set of actions which can be performed on the object. More particularly, the present invention relates to apparatus, and an associated method, by which the actions which can be performed upon an object of a particular datatype are displaying in iconic form upon a computer display device. An action is performed upon the object by dragging and dropping an indication of the object upon the icon representation of the action.

A user of the computer system is able readily to graphically invoke the performance of more than one action on one or more objects. Operations conventionally requiring some application-specific knowledge are simplified, and are intuitively effectuable, through operation of an embodiment of the present invention.

In an exemplary implementation, e-mail procedures are simplified. Generation of an e-mail message to a selected recipient together with attachment of an object to the e-mail message is invoked graphically through simple drag-and-drop movements. In other exemplary implementations, actions associated with address cards and network operations are, analogously, graphically invoked.

BACKGROUND OF THE INVENTION

The use of computers has become pervasive in modern society. Many business, and other, operations are dependent upon the operation of such computers. The popularization of personal computers and computer work stations are exemplary of computers which are widely used to perform a wide variety of functions. Personal computers and computer work stations are characteristic devices which permit their operation as standalone devices, thereby to permit decentralization of computer functions.

Such devices can, however, be advantageously networked together by way of networked connections to permit transfer of data between the separate devices. Users located at disparate locations are permitted access to data, objects, and applications, resident elsewhere, but connected to a local computer or work station by way of a network connection with another computer or work station.

A user of a computer, whether a stand-alone device or a device connected with other computers in a networked connection, typically implements effectuation of computer operations by way of a user interface. The user interface includes input actuators, such as an actuation keypad or a computer "mouse", and a computer display terminal. Through appropriate actuation of the input actuators, the user of the computer is able to, inter alia, initiate the performance of actions upon selected objects. An object is any byte vector that can be determined to be of a particular datatype. A file contained in the file system of a disk drive is exemplary of an object. An attachment to an email message is also exemplary of an object. In such case, the byte vector forming the object is embedded in a larger disk file containing the entire email message, or even email in box.

Graphical interfaces have been developed to facilitate ease of user interaction with the computer. Operating systems or environments such as the MacIntosh™, Windows-95™, and CDE™ (common desktop environment) operating systems and environments, utilize graphical interfaces. Each of 25 such operating systems or environments utilize iconic representations, i.e., icons, displayable upon a computer display device. The icons represent, inter alia, objects. By selectively dragging-and-dropping the icons, operations are performed upon the objects of which an icon is representative. The use of graphical interfaces are advantageous due to their intuitive nature. That is to say, even a relatively unskilled user of the computer is able to implement effectuation of desired operation of the computer even without detailed knowledge of the underlying operation. And, instead of requiring the operator to enter, by way of a conventional computer keypad, a long string of instructions, by appropriate movement of selected icons and performing operations thereon, a user of the computer is more easily able to effectuate the desired actions.

The objects are identified by a datatype, such as an Excel™, Powerpoint™, or Microsoft Word™, datatype. And, each of the different datatypes has associated therewith an action menu. An action menu lists actions which can be performed upon the objects of the particular datatypes. The action menu is, for instance, displayable in a pull-down menu display, conventional in nature. Additional actions can be added, or actions removed from, the action menus associated with the particular datatypes. And, additional datatypes and action menus associated therewith can also be installed at a computer.

Conventionally, an action is chosen to be performed upon an object. For instance, a pull-down menu is caused to be displayed upon the computer display device. An action to be performed upon the object is selected and the action upon the object is performed. That is to say, conventionally, a single action is performed upon a single object. If an additional action is to be performed upon the object, an additional action must be selected. And, when a particular action is selected to be performed, the selected action is performed upon only a single object. If the action requires specification of additional objects, the additional objects must be subsequently specified by a manner that varies according to the action. The manner, e.g., could be to choose in succession each additional object from an object selection dialog. Or, manual entry, in succession, could be performed of the full pathnames of each additional object. Access to the action menus associated therewith and separate selection of the selected actions must be made.

It would be advantageous if a manner could be provided in which the additional objects to be acted upon could be more easily selected.

It is in light of this background information related to computer systems that significant improvements of the present invention have evolved.

SUMMARY OF THE INVENTION

The present invention, accordingly, advantageously provides apparatus, and an associated method, by which to permit convenient selection of actions to be performed upon one or more objects of a particular datatype. The actions which can be performed upon an object of a particular datatype are displayed in iconic form upon a computer display device. The action is performed upon the object by dragging the object's icon representation, also displayed upon the computer display device, to the icon representation of the action.

Thereby, the performance of an action on more than one file is graphically invoked. Levels of application-specific knowledge required of a user of the computer system to invoke the performance of the selected actions upon the selected objects need not be significant due to the intuitive nature of the invocation procedure.

Operation of an embodiment of the present invention simplifies procedures involved in e-mail message generation. Generation of an e-mail message to a selected recipient together with attachment of an object to the e-mail message is invoked graphically. Icons representing the addressing of the e-mail message and an attachment action are displayed upon the computer display device. Simple drag-and-drop movements of objects to the icons representative of the appropriate actions permit the effectuation of the generation of the e-mail message. Operation of other embodiments of the present invention analogously simplify other operations, such as address card operations and network operations. Operation of an embodiment of the present invention permits, with a drag-and-drop procedure the performance of a verb object to/with/in/for, e.g., "mail to", upon a distinguished, i.e., selected object.

In one aspect of the present invention, a method for providing for graphically invoking of an action to be performed upon at least one object is provided. The at least one object is identified by a selected datatype. The selected datatype has an action menu associated therewith which includes at least one action. The method includes providing for iconically representing the at least one action of the action menu associated with the datatype with an iconic representation of the action. The method also includes providing for selectively dragging and dropping the at least one object upon one of the iconic representations of the at least one action. And, the method provides for invoking performance of the selected action upon both the selected object, identified by the at least one dropped object.

In these and other aspects, therefore, apparatus and an associated method, graphically invokes an action to be performed upon a selected object and at least one dropped object identified by a selected datatype. The selected datatype has an action menu associated therewith. The action menu includes at least one action. The at least one action of the action menu associated with the datatype is iconically represented with an iconic representation of the action. The at least one object is selectively dragged and dropped upon the iconic representation. Performance of the action upon the selected object and the dropped object is thereafter invoked.

A more complete appreciation of the present invention and the scope thereof can be obtained-from the-accompanying drawings which are briefly summarized below, the following detailed description of presently-preferred embodiments of the invention, and the appended claims.

DETAILED DESCRIPTION

Figure 1:
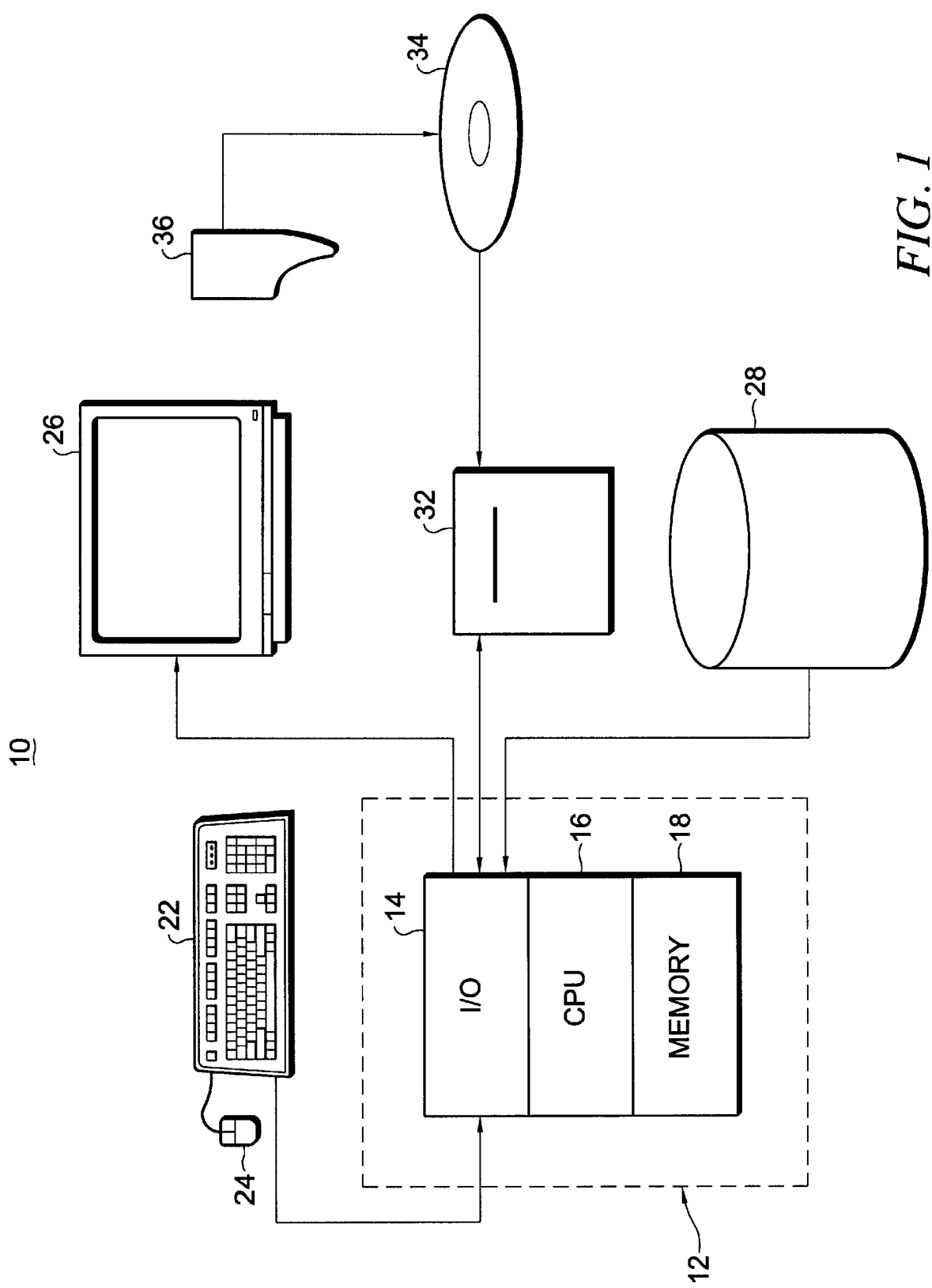
FIG. 1 illustrates a partial functional, partial schematic diagram of a computer system in which an embodiment of the present invention is operable.

FIG. 1 illustrates a computer system, shown generally at 10, in which an embodiment of the present invention is operable. The computer system 10 is exemplary of a personal computer or a computer work station. In an exemplary implementation in which the computer system 10 is networked together in a networked connection with a computer network, the computer system 10 is exemplary of a general purpose computer, work station, personal computer, or the like, connected via communication links of the various types, in a client-server arrangement. In such an arrangement, programs and data, many in the form of objects, are made available by various members of the system for execution and access by other members of the system.

The computer system 10 includes a processor 12, here shown to have an I/O (input/output) section 14, a CPU (central processing unit) 16, and a memory section 18.

The I/O section 14 is connected to a user interface, here including an actuation keyboard 22, a "mouse" transducer 24, and a computer display device 26. User-generated inputs are provided to the computer system 10 by way of appropriate actuation of the actuation keypad 22 or the electronic mouse 24. And, the computer display device 26 generates displays for viewing by a user of the computer system.

The I/O section 14 is also coupled to storage devices, here a disk storage device 28 and a CD-ROM drive unit 32. The drive unit 32 is operable to read a CD-ROM medium 34, which typically contains programs and data, of which the program 36 is representative. Programs, when executed, cause operation of an embodiment of the present invention. Such programs, and associated data, may reside in the memory section 18, the disk storage device 28, or at the CD-ROM medium 34.

Operation of an embodiment of the present invention facilitates user initiation of performance of actions upon one or more objects resident at the computer system. The objects resident at the computer system are data-typed according to the object's type. For instance, the object might be a Microsoft Word object or an Excel object, or an analogously-typed object. Each datatype of object has an action menu associated therewith. The action menu includes one or more actions which can be performed upon the object of a particular datatype. In some conventional icon-based operating systems, such as CDE (common desktop environment) or Windows-95, the objects are typically represented by object icons upon the computer display device 26. A pull-down menu forms the action menu containing a list of actions which may be performed upon the object. And, an action is caused to be performed upon the associated object, e.g., by positioning a screen display cursor upon the appropriate action through appropriate actuation of the mouse actuator 24 and, e.g., "key-clicking" the mouse actuator. When the same action is to be performed upon more than one object, the same procedure must be repeated. And, when several actions are to be performed upon a single object, the procedure correspondingly must also be repeated.

Figure 2:
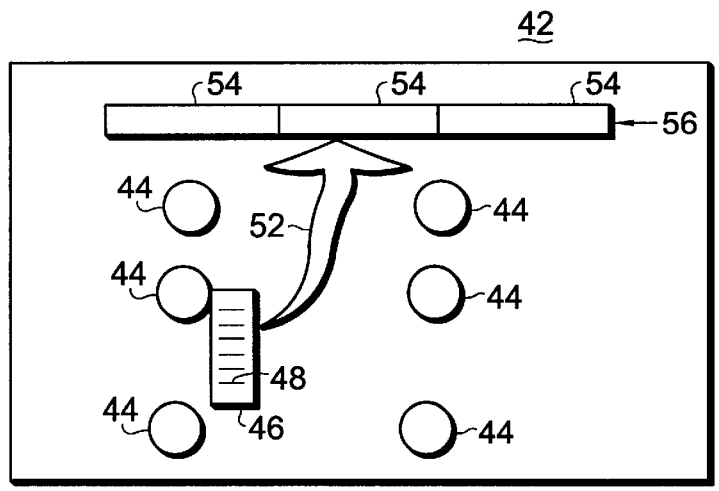
FIG. 2 illustrates an exemplary computer screen display illustrating an icon representation, formed during operation of an embodiment of the present invention, of actions performable upon an object.

FIG. 2 illustrates a display 42, displayable upon the computer display device 26, shown in FIG. 1. The display 42 includes icon representations 44 which, for purposes of illustration, are all of a common datatype. As noted, an action menu, of which a single action menu 46 is illustrated in the Figure, is associated with each object of a particular datatype. The action menu 46 forms a menu display listing actions 48 which may be caused to be performed upon the object 44. During operation of an embodiment of the present invention, the actions 48 of the action menu 46 are converted, as represented by the arrow 52, into iconic representations 54. In the illustrated embodiment, the iconic representations 54 are together displayed in a toolbar 56.

Figure 3:
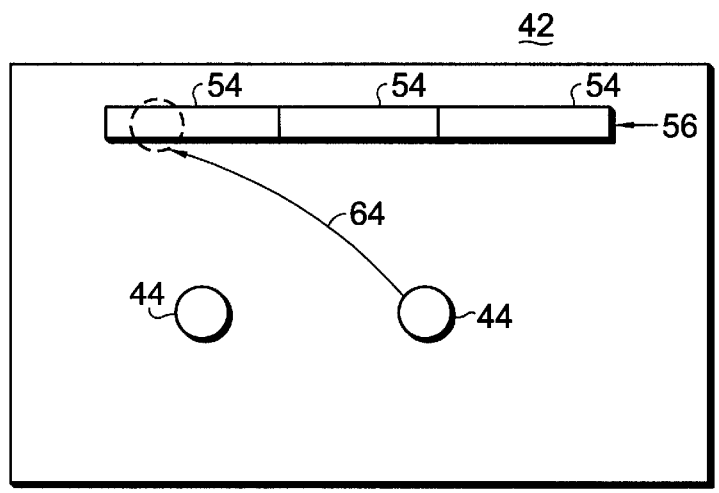
FIG. 3 illustrates a computer screen display, similar to that shown in FIG. 2, but here illustrating a manner by which to graphically invoke performance of an action upon an object.

FIG. 3 again illustrates the display 42 generated during operation of an embodiment of the present invention. Here, the left-most (as shown) icon representation 44 has been selected, and the actions 48 (shown in FIG. 2) of the action menu 46 (also shown in FIG. 2) of the datatype of the object identified by the left-most icon representation are converted into iconic form, and are determinative of the iconic representations of the toolbar 56. The iconic representations 54 which together form the toolbar 56 are again positioned across a top (as shown) portion of the display 42. The left-most icon representation forms the selected object, identified by its datatype. A user of the computer-system here operates the mouse actuator 24 (shown in FIG. 1) to drag the right-most object 44 to the iconic representation 54 representing the action which is to be performed. The arrow 64 is representative of the dragging of an icon representation 44 of an object, the "dropped object" to the left-most (as shown) iconic representation 54 of the toolbar 56 and dropping the object on the iconic representation 54. As the arrow 64 illustrates, a user actuating the mouse actuator 24 (shown in FIG. 1) is able to drag an additional object 44, Viz., the right-most object, to a single iconic representation 54. Thereby, an action is invoked upon the combination of the selected object and the at least one dropped object.

Once the object 44 has been positioned at the selected iconic representation 54, the iconic representation is dropped thereat. Once the icon representation 44 of the object is dropped at the representation 54 of an action, the action is caused to be performed upon the object. The same action is performed upon successive objects by dragging-and-dropping such successive objects to and upon the iconic representation representative of the action.

Figure 4:
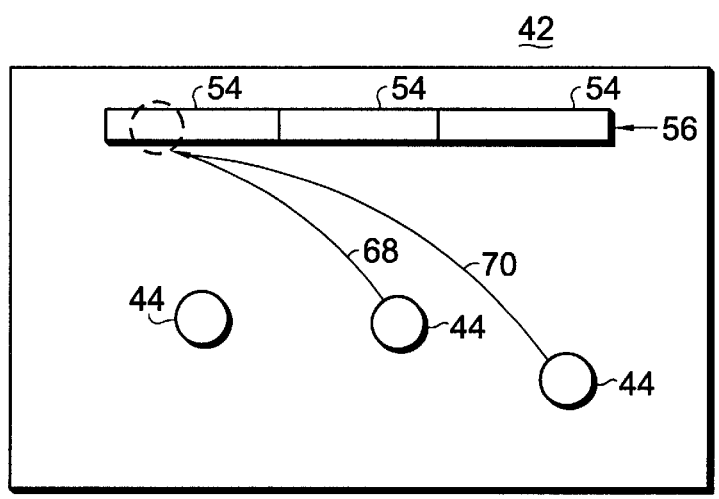
FIG. 4 illustrates a computer screen display, similar to that shown in FIGS. 2–3, but here showing a manner by which to graphically invoke the performance of an action upon more than one file.

FIG. 4 again illustrates the display 42, shown previously in FIGS. 2 and 3. Here again, icon representations 44 form portions of the display and are representative of objects of a particular data type. And, iconic representations 54 which together form a toolbar 56 also form a portion of the display. The toolbar 56 is formed of the actions of the action menu of a selected object. Once the toolbar is displayed, a selected action is caused to be performed upon more than one object by executing drag-and-drop operations. Here, arrows 68, and 70 are representative of drag-and-drop procedures by which to drag and drop the objects represented by the icon representations 44 at the left-most iconic representation 54. When the representations 44 are dropped upon an iconic representation 54, the action of which the iconic representation 54 is representative is caused to be performed. Here, the action represented by the left-most iconic representation is performed upon the selected object, i.e., the left-most object 44 and also both dropped objects, i.e, the center-most and right-most-objects 44.

Figure 5:
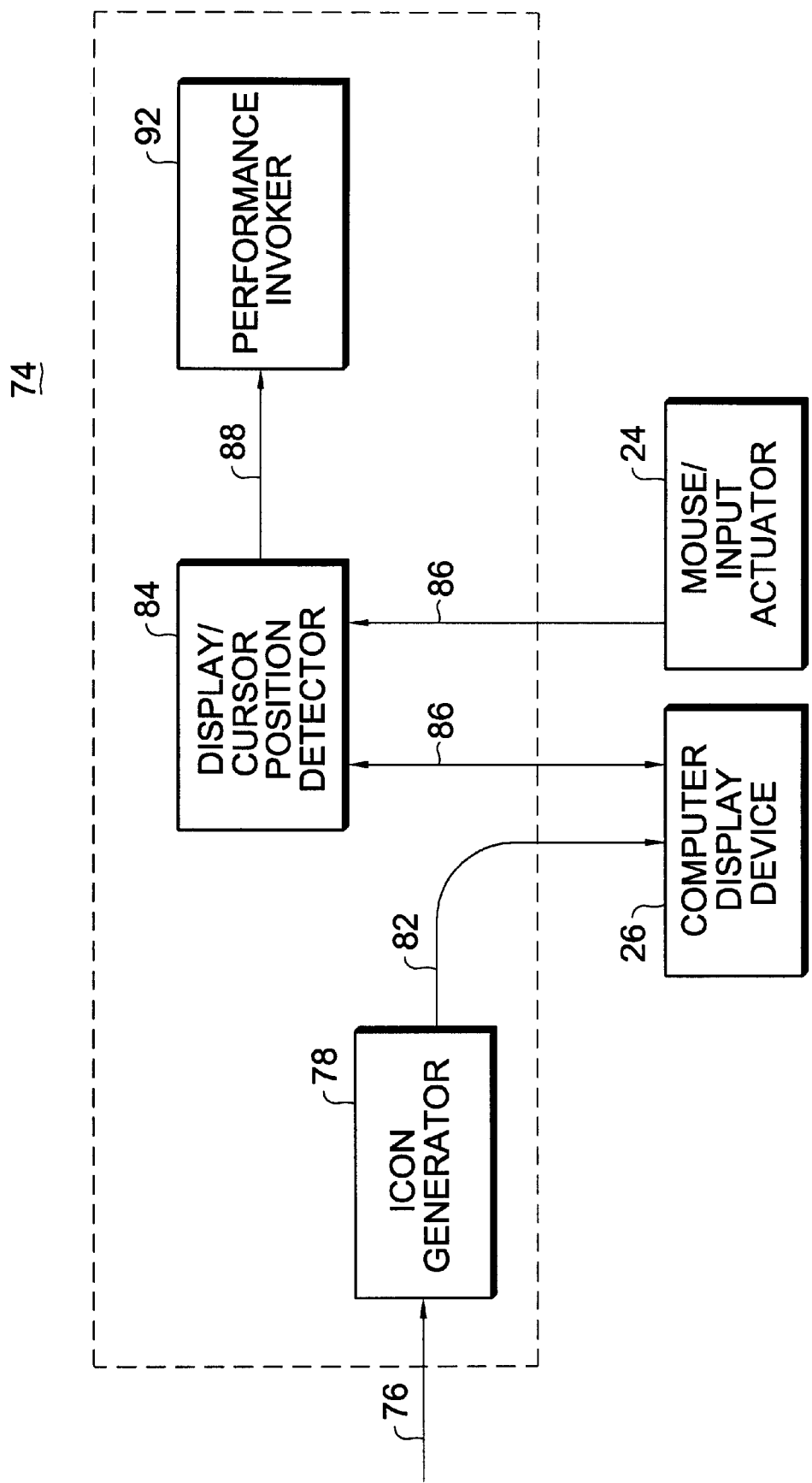
FIG. 5 illustrates a functional block diagram of the apparatus of an embodiment of the present invention.

FIG. 5 illustrates the apparatus, shown generally at 74 of an embodiment of the present invention. The apparatus is embodied in a computer system, such as the computer system 10 shown in FIG. 1. The apparatus graphically invokes an action to be performed upon at least one object resident in the computer in which the object is identified by a datatype. The datatype of the object has associated therewith an action menu containing actions.

Indications of the actions listed in the action menu are supplied by way of the lines 76 to an icon generator 78. The icon generator converts the action lists into icon representations corresponding to each of the actions of which the indications thereof are supplied to the generator 78. The line 82 extending to the computer display device 26 is representative of signals generated by the icon generator 78 to cause the icons to be displayed upon the display of the display device.

A display/cursor position detector is coupled by way of the lines 86 to the user interface formed of the computer display device 26 and mouse actuator 24. The position detector 84 is operable responsive to user actuation of the mouse actuator 24 to effectuate drag-and-drop movement of icons displayed upon the computer display device 26 upon the selected icon representations of actions caused to be displayed upon the display device 26. The detector 84 is further operable to generate signals on the lines 88 which extends to the performance invoker 92. The performance invoker invokes performance of an action upon the object which is dragged-and-dropped upon the icon representation of the action.

While the apparatus 74 is shown functionally in the Figure, in the exemplary implementation, the functions of the icon generator, display/cursor position determiner 84 and performance invoker 92 are implemented as algorithms executable by a computer processing device, such as the CPU 16, shown in FIG. 1.

Through operation of an embodiment of the present invention, therefore, a user is able to graphically invoke complex operations simply and intuitively. For instance, an embodiment of the present invention may be implemented in conjunction with an address card program. Icon representations of a "mail to" action, "fax" action, and "calendar" action, for the selected address card are displayed in the form of a toolbar on a computer display device. By dragging an dropping appropriate objects upon the action icons, the objects are mailed to the card, faxed to the card, or added to the card's calendar, respectively. An action can thereby be performed upon the selected contact and the dragged objects merely by performing a drag-and- drop procedure.

In another implementation, operation of an embodiment of the present invention permits integration of the personal information management tools of the computer system, such as a mailer, calendar, browser, and file manager, around electronic address cards stored in a standard format, such as the vCard format. And, in yet another implementation, operation of an embodiment of the present invention facilitates host operations of hosts in a computer network. Actions corresponding to, inter alia, opening a terminal on a host, running programs on a host, and rebooting a host, are represented in iconic representations such as in a toolbar on a display device.

Figure 6:
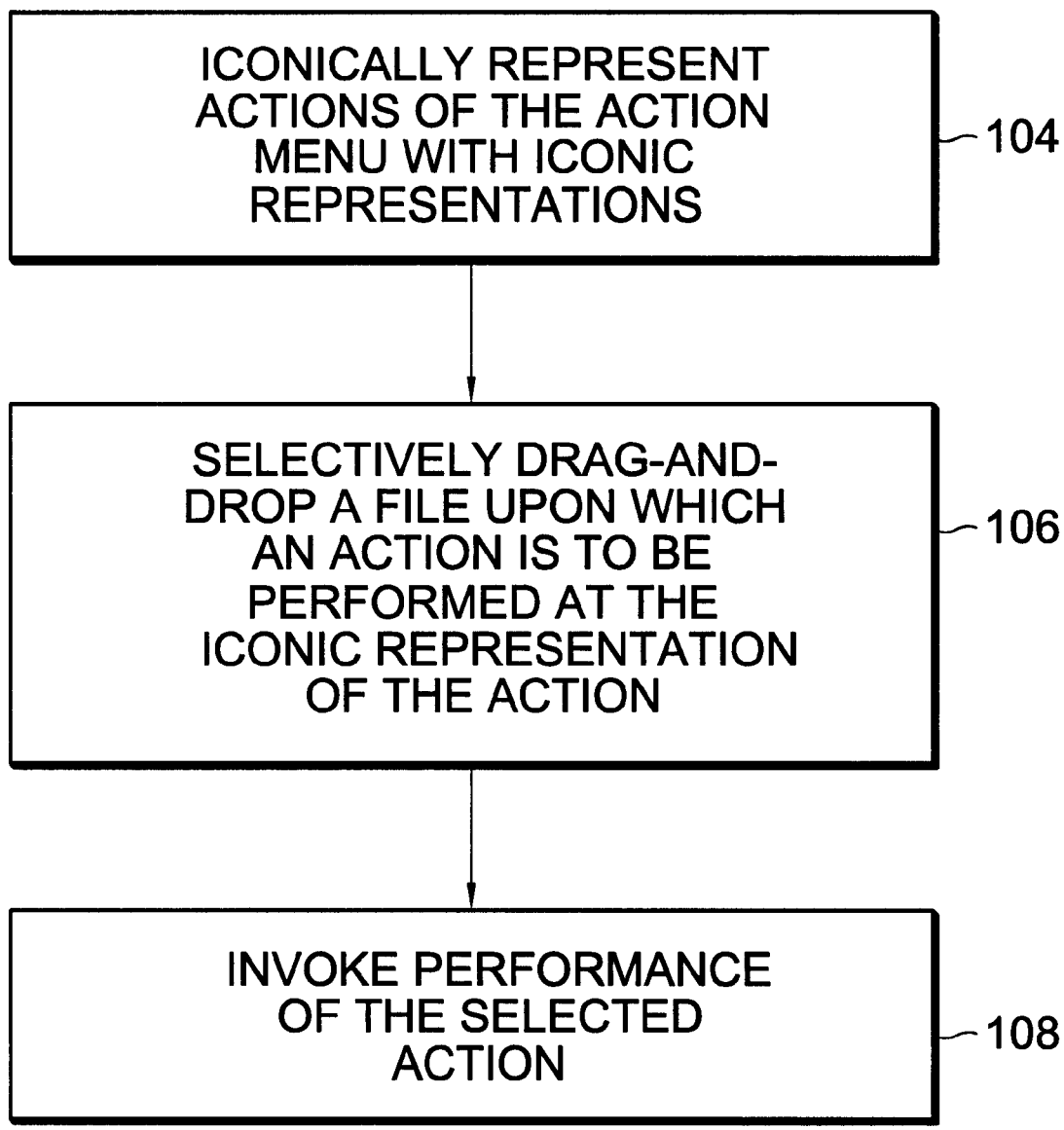
FIG. 6 illustrates a method flow diagram listing the method steps of the method of an embodiment of the present invention.

FIG. 6 illustrates a method, shown generally at 102, of an embodiment of the present invention. The method 102 graphically invokes an action to be performed upon an object identified by a selected datatype. The datatype has an action menu associated therewith formed of one or more actions.

First, and as indicated by the block 104, the action or actions of the action menu associated with the datatype are iconically represented with an iconic representation of each of the actions. Then, and as indicated by the block 106, an object upon which an action is to be performed is selectively dragged-and-dropped at the iconic representation. Then, and as indicated by the block 106, performance of the selected action is invoked to perform the action upon the both the dropped object and the selected object.

Figure 7:
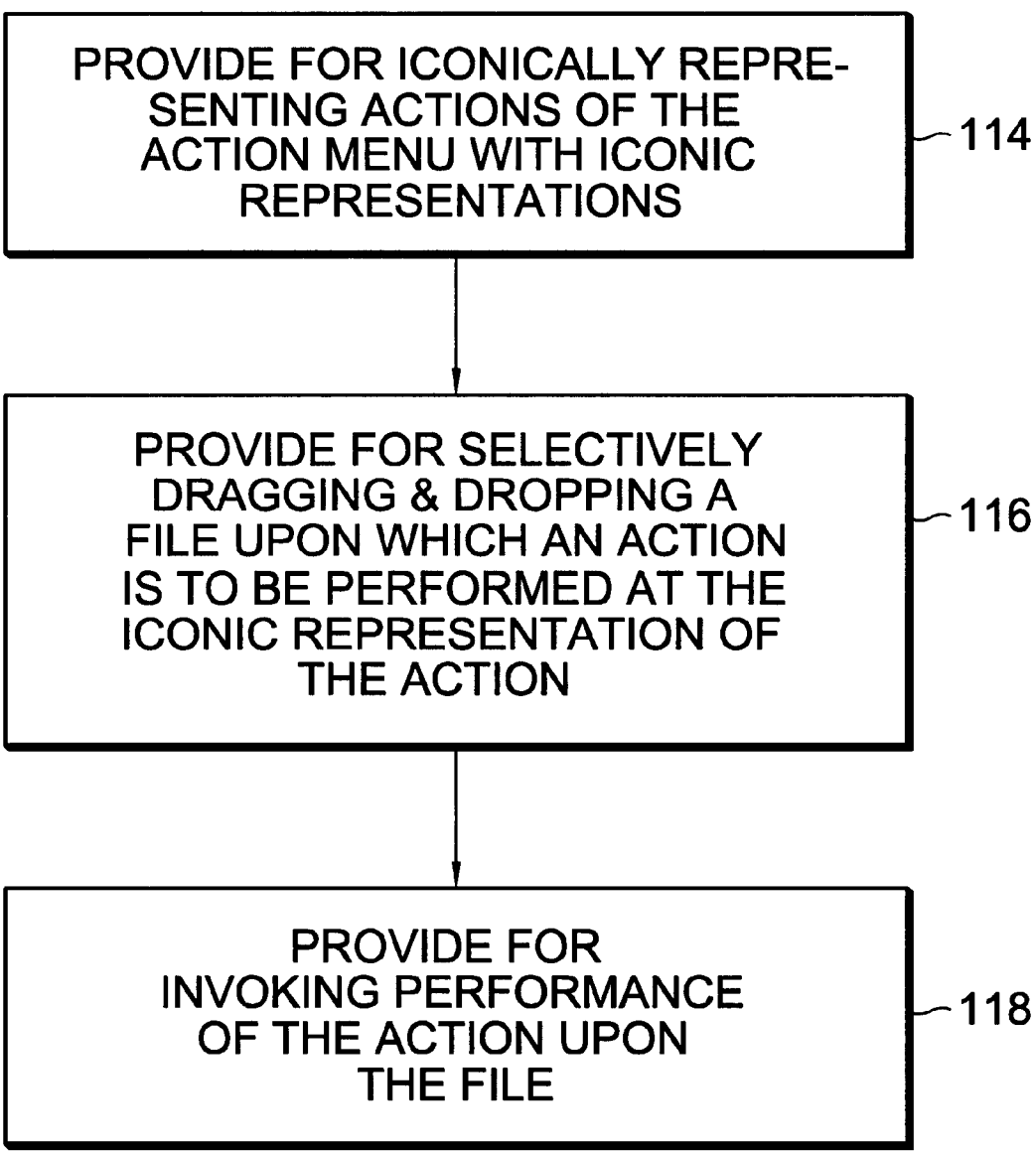
FIG. 7 illustrates a method flow diagram listing the method steps of the method of another embodiment of the present invention.

FIG. 7 illustrates the method steps of a method, shown generally at 112, of another embodiment of the present invention. The method 112 provides for graphically invoking an action to be performed upon both a selected object and a dropped object. The selected object is identified by a selected datatype, and the selected datatype has an action menu associated therewith. First, and as indicated by the block 114, the method includes the step of providing for iconically representing the action of the action menu with an iconic representation thereof. Then, and as indicated by the block 116, the method includes the step of providing for selectively dragging and dropping the dropped object upon the iconic representation. Then, and as indicated by the block 118, the method includes the step of providing for invoking performance of the action upon both the selected and dropped object.

Figure 8:
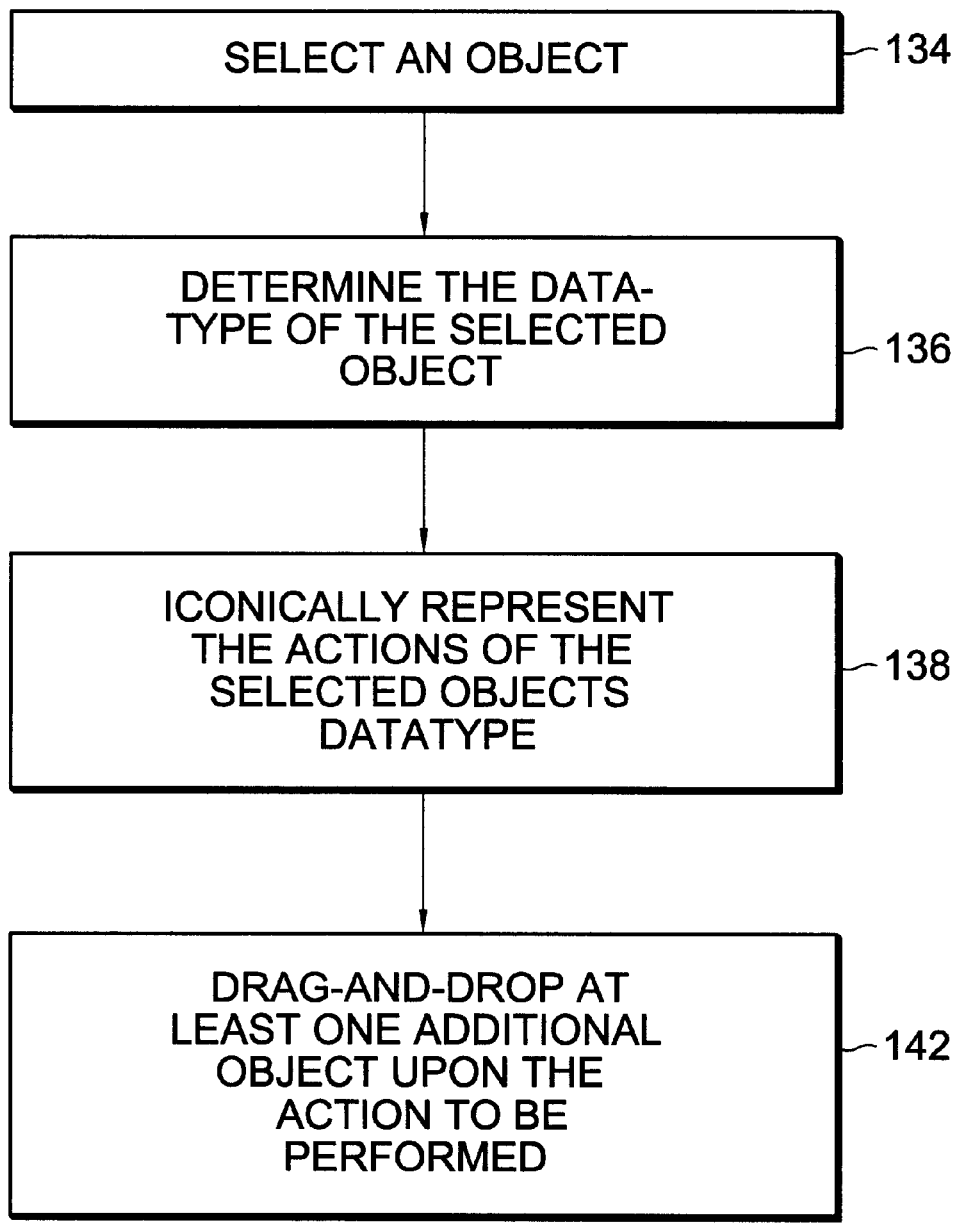
FIG. 8 illustrates a method flow diagram listing the method steps of the method of a further embodiment of the present invention.

FIG. 8 illustrates the method steps of a method, shown generally at 132, of another embodiment of the present invention. First, and as indicated by the block 134, an object is selected. Then, and as indicated by the block 136, the datatype of the object is determined. Thereafter, and as indicated by the block 138, the actions of the selected object's datatype are iconically represented. Then, and as indicated by the block 142, one or more additional objects upon which an action is to be performed, are dragged-and-dropped at the iconic representation of the action. Then, and as indicated by the block 144, the action upon both of the selected objects are invoked.

Operation of an embodiment of the present invention, therefore, provides a manner by which to more speedily and easily invoke complex operations at a computer station. Actions which can be performed upon an object of a particular datatype are displayed in iconic form upon a computer display device. Performance of a selected action is invoked by dragging and dropping an indication of the object upon the icon representation of the action.

The previous descriptions are of preferred examples for implementing the invention, and the scope of the invention should not necessarily be limited by this description. The scope of the present invention is defined by the following claims.

I claim:

1. A method for graphically invoking an action to be performed upon at least two objects identified by a datatype, the datatype having an action menu associated therewith, the action menu including at least one action, said method comprising:

selecting a first object;

in response thereto, generating an iconic representation representing the at least one action menu associated with the datatype of the first selected object;

selectively dragging and dropping the first object upon the iconic representation of the at least one action of the action menu;

selecting a second object having the same datatype of the first selected object, wherein the iconic presentation remains displayed;

selectively dragging and dropping the second selected object upon the iconic representation of the at least one action of the action menu; and in response thereto, invoking performance of the at least one action upon the first selected object together with the second selected object, wherein the iconic representation remains displayed until at least such time as when the at least one action is carried out upon the selected first and second objects and a new object having a different datatype is selected.

2. The method of claim 1 Wherein said operation of representing comprises displaying the iconic representation of the at least one action upon a toolbar.

3. The method of claim 1 comprising the additional operation of representing the at least one of the first object and the second object with an icon.

4. The method of claim 3 wherein the operation of selectively dragging and dropping comprises dragging an icon representing at least one of the first object and the second object upon the iconic representation of the at least one action of the action menu.

5. The method of claim 1 wherein the method comprises the additional operation of adding at least one additional action to the action menu associated with the datatype.

6. The method of claim 1 wherein the operations of representing, selectively dragging and dropping, and invoking performance are carried out within a container-type application.

7. The method of claim 6 wherein said container-type application comprises an e-mail application, wherein the at least one action of the action menu associated with the datatype comprises an "open-address card" action, a "mail to" action, and a "print" action, and wherein said operation of representing comprises representing the "open-address card" action with an open-address card icon, representing the "mail to" action with a mail to icon, and representing the "print" action with-a-print-icon.

8. The method of claim 6 wherein said container-type application comprises an address card application.

9. The method of claim 6 wherein said container-type application comprises a host address application for at least one host of a multi-host network.

10. The method of claim 1, wherein the steps of selecting an object with the same datatype of the first selected object, selectively dragging and dropping the selected object upon the iconic representation and invoking performance of the at least one action are repeated based on the number of selected objects.

* * * * *